US00RE41861E

(19) United States
(12) Reissued Patent
Landhuis

(10) Patent Number: US RE41,861 E
(45) Date of Reissued Patent: Oct. 26, 2010

(54) DECOUPLED CHECK-RELIEF VALVE

(76) Inventor: Kevin J. Landhuis, 1405 NW. Maple St., Ankeny, IA (US) 50021

(21) Appl. No.: 11/245,403

(22) Filed: Nov. 30, 2005

Related U.S. Patent Documents

Reissue of:
(64) Patent No.: 6,910,502
Issued: Jun. 28, 2005
Appl. No.: 10/404,362
Filed: Apr. 1, 2003

(51) Int. Cl.
*F16K 17/18* (2006.01)

(52) U.S. Cl. ..... 137/565.35; 137/493.4; 137/493.6; 137/493.9; 137/514.3; 137/514.5; 137/514.7; 417/307

(58) Field of Classification Search ..... 137/493.4, 137/493.6, 493.9, 514.3, 514.5, 514.7, 565.35; 417/307, 308, 309
See application file for complete search history.

(56) References Cited

U.S. PATENT DOCUMENTS

| | | | | | |
|---|---|---|---|---|---|
| 1,853,391 | A | | 4/1932 | Westman et al. | |
| 2,339,101 | A | | 1/1944 | Parker | |
| 2,593,522 | A | * | 4/1952 | Barnes | 137/154 |
| 3,861,414 | A | | 1/1975 | Peterson, II | |
| 3,867,289 | A | * | 2/1975 | Ortega | 137/514.5 |
| 3,888,280 | A | | 6/1975 | Tartaglia | |
| 4,016,903 | A | * | 4/1977 | Akashi et al. | 137/493.5 |
| 4,114,560 | A | * | 9/1978 | Wegmann | 116/272 |
| 4,134,424 | A | | 1/1979 | Zeyra et al. | |
| 4,270,569 | A | * | 6/1981 | Reay et al. | 137/514.7 |
| 4,300,591 | A | * | 11/1981 | Sutton | 137/493.4 |
| 4,859,155 | A | | 8/1989 | Laqua | |
| 4,923,602 | A | | 5/1990 | Blood | |
| 5,183,075 | A | | 2/1993 | Stein | |
| 6,286,730 | B1 | | 9/2001 | Amidzich | |
| 6,910,502 | B2 | * | 6/2005 | Landhuis | 137/565.35 |

FOREIGN PATENT DOCUMENTS

| | | |
|---|---|---|
| JP | 4938593 | 4/1974 |
| JP | 58118383 | 7/1983 |
| JP | 2002168356 | 6/2002 |

* cited by examiner

*Primary Examiner*—Stephen Hepperle

(57) ABSTRACT

A decouple check-relief valve for use in a hydraulic fluid circuit is provided that has a cylinder guide housing which travels during the check function of the valve. The cylindrical guide housing has a clearance parameter, allowing for the selection of an optimal check response time. A dampening disk is provided inside the cylindrical guide housing, traveling within the guide during the relief function of the valve. The dampening disk has a separate clearance parameter, allowing for the selection of an optimal dampening capacity and fluid circuit stability. As such, the check and relief clearance parameters are independent of each other to allow both the check and relief functions of the valve to be optimized.

12 Claims, 8 Drawing Sheets

DECOUPLED CHECK-RELIEF VALVE

Matter enclosed in heavy brackets [ ] appears in the original patent but forms no part of this reissue specification; matter printed in italics indicates the additions made by reissue.

BACKGROUND OF THE INVENTION

This invention relates generally to valves and, more specifically, a check-relief valve for use in hydraulic fluid circuits.

Check-relief valves are well known in the art. Such valves essentially combine the functions of both check and relief valves into one body. Check valves control the direction of flow of fluid, allowing fluid flow to travel only in the direction of lower pressure. Check valves prevent backpressure from reversing the flow of a fluid circuit. Relief valves serve as a vent for excessive backpressure. When backpressure exceeds a threshold level, a relief valve will open to prevent backpressure from increasing and damaging the fluid circuit. The advantage of check-relief valves is the conservation of space gained by bringing two functions into a single body.

Conventional cartridge-style check-relief valves comprise a guide with a centrally-located stem. The stem is connected to the dampening disk at one end of the stem and is critical to the relief function of the valve. The guide and stem combination ride within a base or plug. The guide has a seat on the side opposite the plug. The valve normally remains in a closed position, which is where no fluid flows past the valve. In operating as a check valve, pressure drives the guide and stem combination of the conventional device into the plug, forcing the seat to move to an open position and allow fluid flow. When fluid flows past seat, the valve is said to be in the check position. The greater the clearance between the outer diameter of the dampening disk and the inner diameter of the plug, the greater the rate of fluid flow past the dampening disk and the faster the valve will be able to move into the check position. A check spring, which is of the helical compression type, works to resist the movement of the guide and stem combination and will reseat the valve upon a certain diminished level of pressure.

In operating as a relief valve, backpressure of a threshold level will drive the dampening disk and stem combination of the conventional device away from the plug. Because the seat already is in the closed position, a gap opens between the stem and seat, allowing the backpressure to vent. When fluid flows through the gap between the stem and the seat, the valve is said to be in the relief position. A relief spring, which also is of the helical compression type, works to resist the motion of the dampening disk and stem combination and will return the stem to a closed position upon a certain diminished level of backpressure. The smaller the clearance between the outer diameter of the dampening disk and the inner diameter of the plug, the greater the dampening capacity of the disk and the greater the stability of the system will be.

With conventional cartridge-style check-relief valves, it is desired to have a large clearance between the plug and the dampening disk in order to optimize the performance of the check function and minimize the time needed to move the valve into the check position. In a hydrostatic pump situation, a flash check time is partially desired when beginning operation from a cold start. Yet, it also is desirable to have a small clearance between the plug and dampening disk in order to maximize the dampening capacity of the valve when moving into the relief position. This leads to greater stability through the fluid circuit. In a hydrostatic pump situation, greater dampening capacity is desired when operating at higher temperatures.

A disadvantage of conventional cartridge-style check-relief valves is that the clearance parameter is restricted only to one value. As such, both the check and relief functions of the valve are governed by the same clearance parameter. Essentially, this means that one of the functions, check or relief, must be compromised as it is only possible to optimize one function at a time. Either there will be a large clearance between the outer diameter of the dampening disk and the inner diameter of the plug, which benefits the check function, or the clearance will be small, which benefits the relief function.

It is therefore a principal object of this invention to provide a check-relief valve that allows for a quick check response time while still allowing for sufficient relief dampening and fluid circuit stability.

Another object of this invention is to provide a check-relief valve that allows for separate clearance parameters for both the check as well as the relief functions of the valve.

A further object of this invention is to provide a check-relief valve with separate check and relief clearance parameters that minimizes the number of components.

Another object of this invention is to provide a check-relief valve with separate check and relief clearance parameters than conserves physical space.

Yet another object of this invention is to create a check-relief valve with separate check and relief clearance parameters that minimizes manufacturing time and cost.

These and other objects will be apparent to those skilled in the art.

BRIEF SUMMARY OF THE INVENTION

The present invention is directed towards a cartridge-style check-relief valve for use in a hydraulic fluid circuit. When the pressure in the check direction exceeds the backpressure, the present invention serves as a check valve and the valve seat opens. When the backpressure exceeds a calibrated level while the valve is in the closed position, the present invention serves as a relief valve and the valve stem opens to vent the backpressure.

The present invention utilizes a cylindrical guide housing that alters the clearance parameter used in the check and relief positions. As such, one clearance parameter may be used for the check position, while a different clearance parameter may be used for the relief. Separate clearance parameters allow both the check and relief positions to be optimized.

The present invention and the advantages provided thereby will be more fully understood upon further study of the following description of certain embodiments of the invention and the accompanying drawings.

DESCRIPTION OF THE PREFERRED EMBODIMENTS

The present invention will be described as it applies to its preferred embodiment. It is not intended that the present invention be limited to the preferred embodiment. It is intended that the invention cover all modifications and alternatives that may be included within the spirit and scope of the invention.

Figure 1:
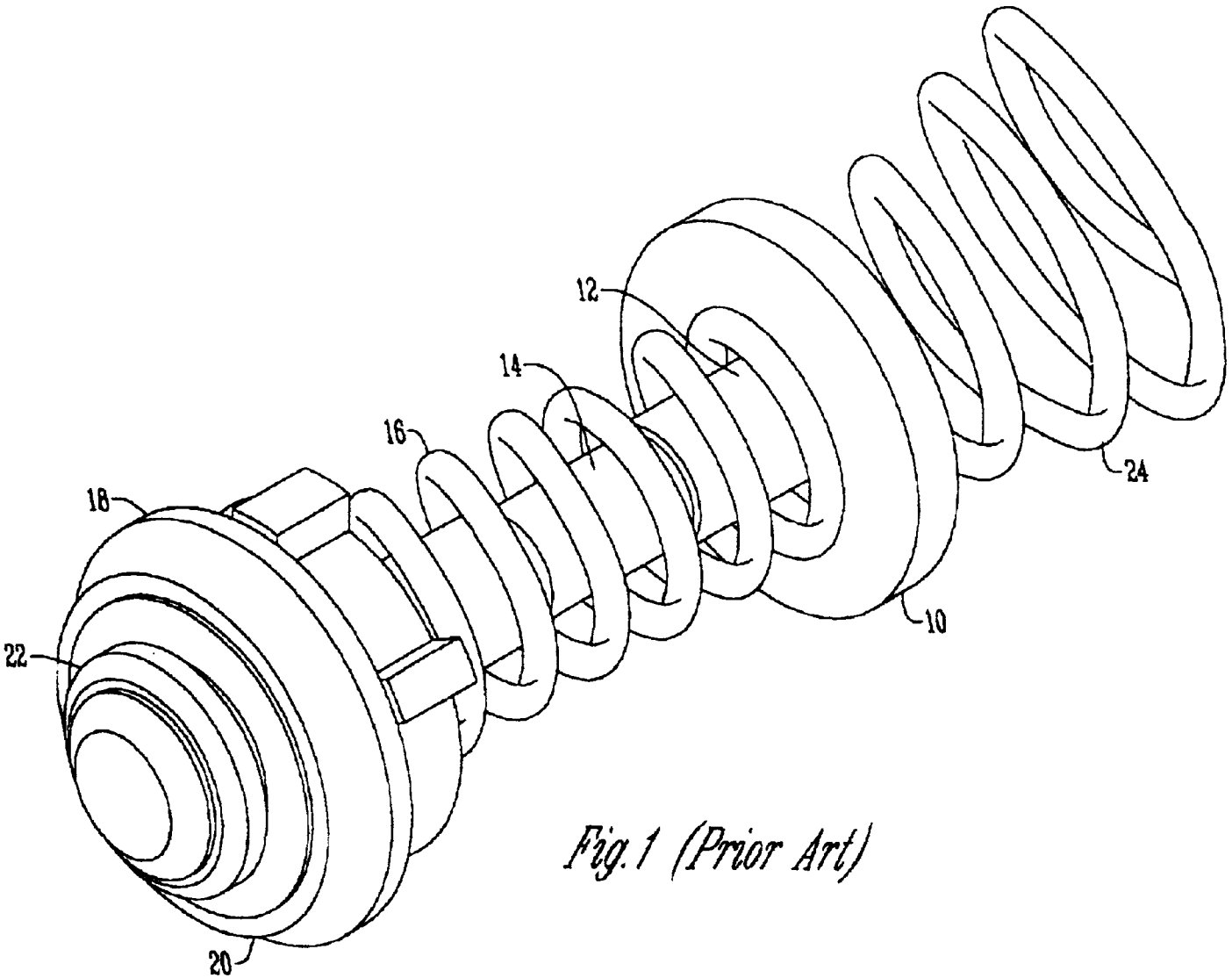
Fig. 1 (Prior Art)
FIG. 1 is a perspective view of the components of a conventional cartridge-style check-relief valve.
Figure 3:
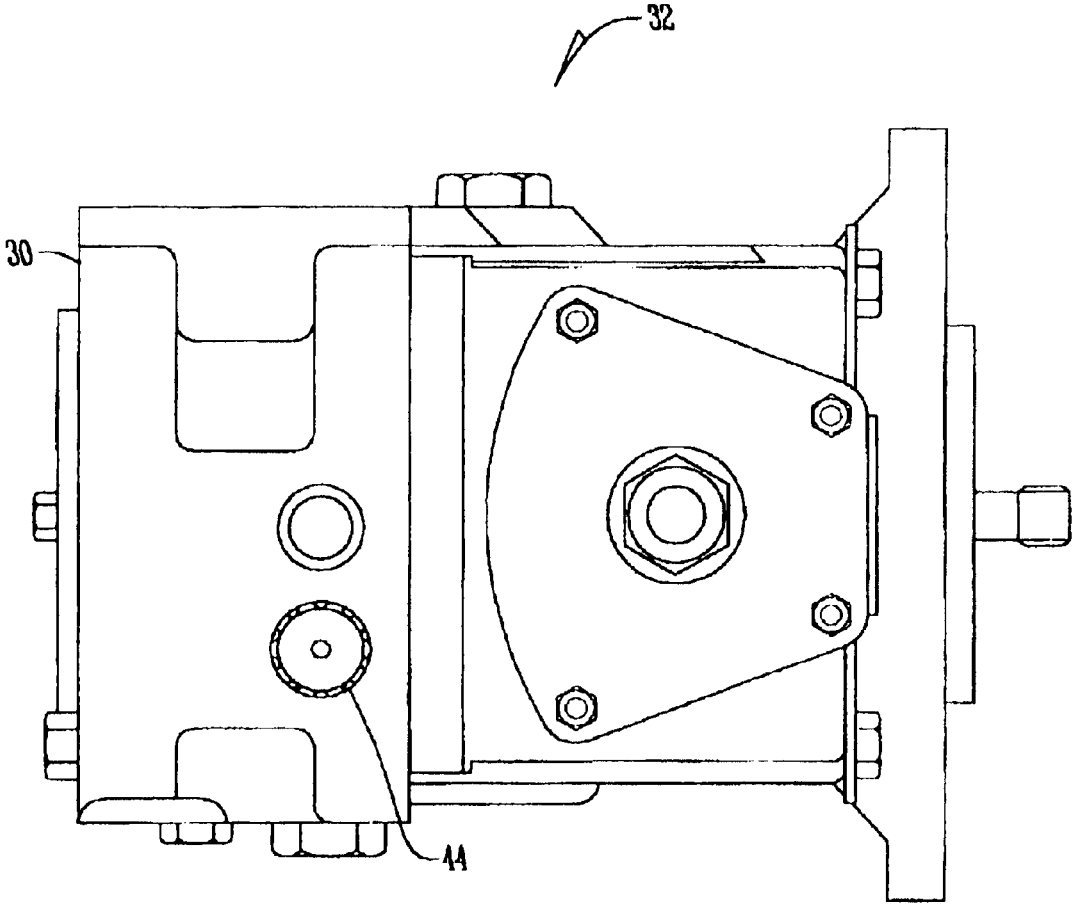
FIG. 3 is a side view of a hydrostatic pump.
Figure 5:
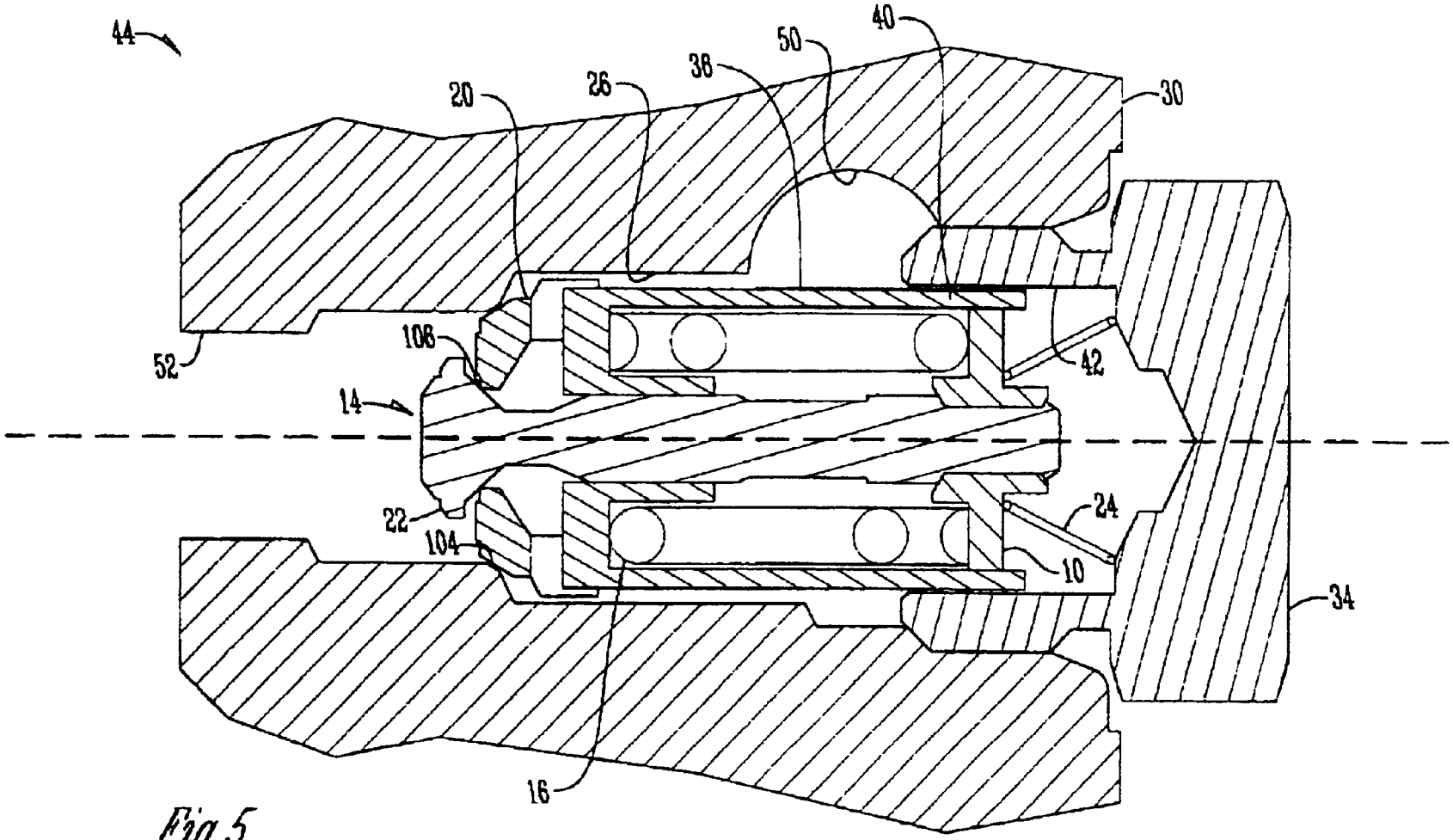
FIG. 5 is a sectional view of the decoupled check-relief valve of FIG. 4 in the closed position.
Figure 5A:
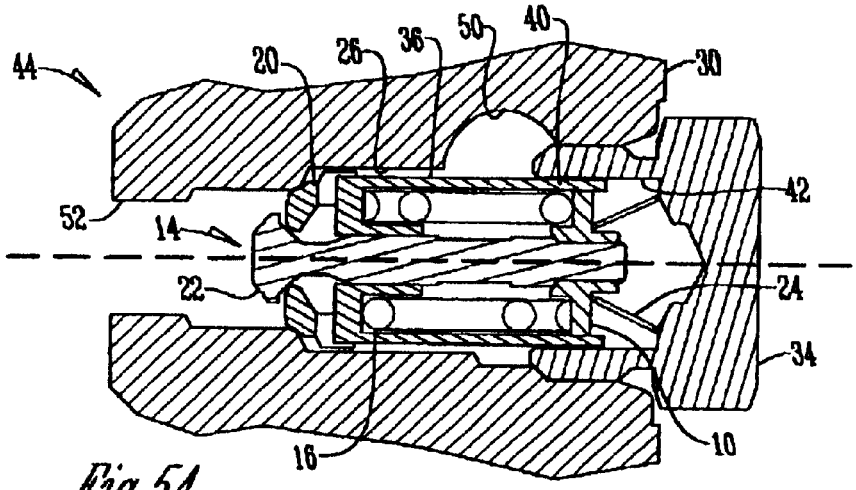
FIG. 5A is a sectional view similar to FIG. 5.
Figure 7A:
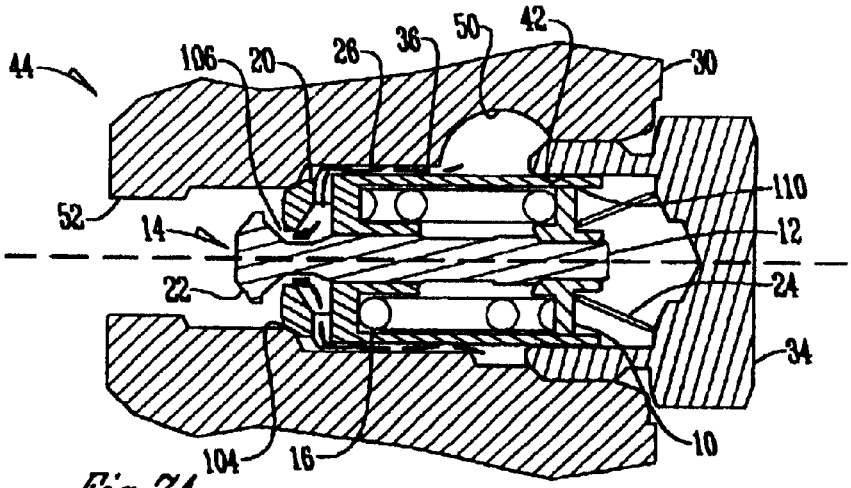
FIG. 7A is a sectional view similar to FIG. 7.

With reference to FIG. 1, a perspective drawing of the components of a conventional cartridge-style check-relief valve is shown. A dampening disk or nut 10 is attached to the bottom 12 of stem 14. A relief spring 16 rests on the dampening disk and presses against a conventional guide 18. Relief spring 16 is a helical compression spring with a constant spring diameter. The guide 18 forces a seat 20 against the head 22 of stem 14. A check spring 24 is attached to the bottom 12 of stem 14. Check spring 24 is a helical compression spring with a decreasing spring diameter. The end of spring 24 that engages with the bottom 12 of stem 14 has a smaller spring diameter than the opposite end of spring 24. All of these components typically are inserted within a cavity 26 (FIG. 5) of the end cap 30 of a hydrostatic pump 32 (FIG. 3). The components typically are retained within the end cap 30 by a plug 34 which attaches to the end cap 30 (FIG. 5).

Figure 2:
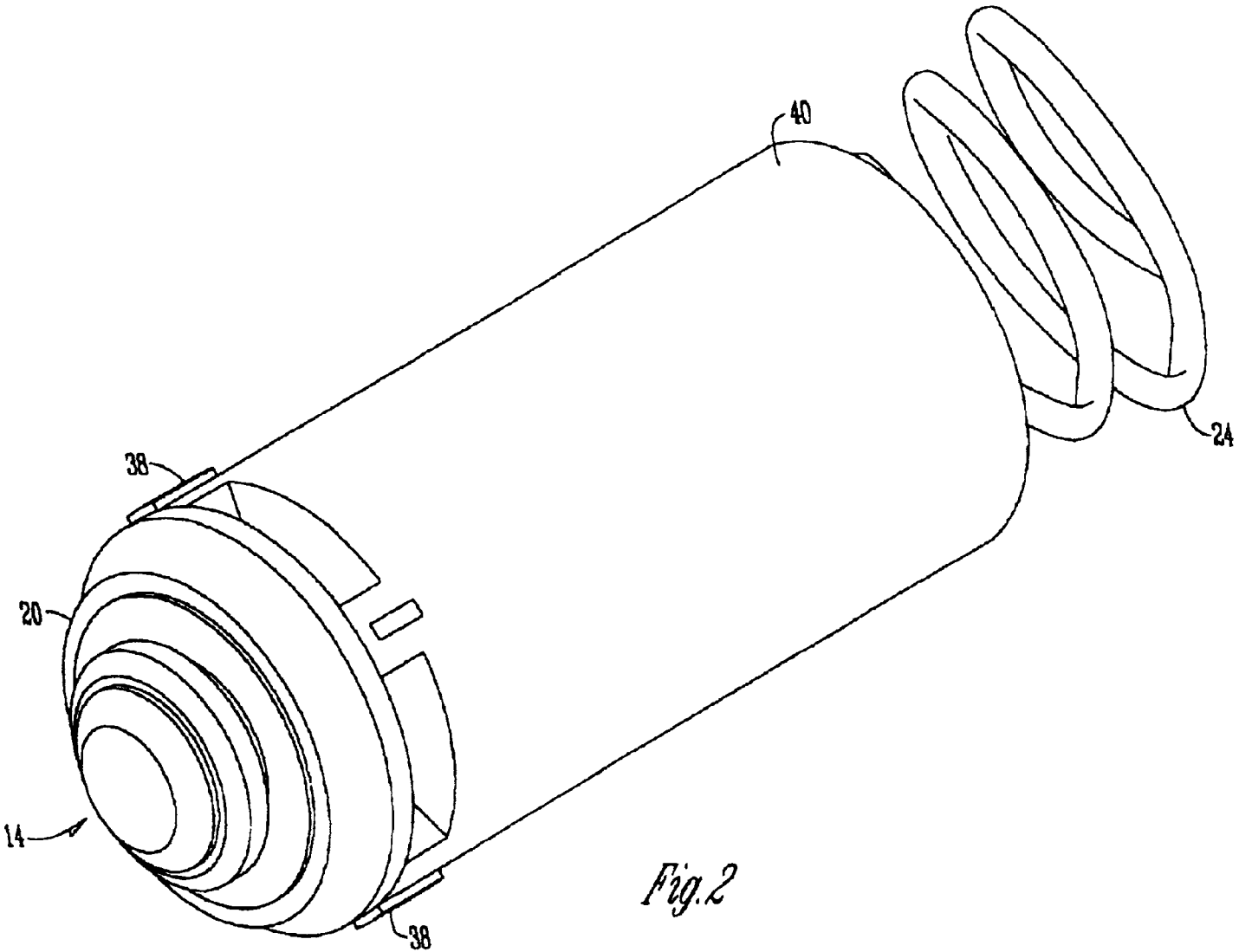
FIG. 2 is a perspective view of the components of the present invention, decoupled check-relief valve.

The primary difference between the present invention and the conventional check-relief spring depicted in FIG. 1 is the cylindrical guide housing 36 shown in FIG. 2. Guide housing 36 is attached to the seat 20 and encloses the dampening disk or nut 10 and the relief spring 16. Guide housing 36 has protrusions 38 that span part of the length of the guide. As the guide housing 36 moves to the check position, protrusions 38 ride within the cavity 26 of the pump end cap 30 (FIG. 5). The protrusions 38 center the guide housing 36 and minimize friction between the cavity 26 and the guide housing 36. The guide housing 36 also has a smooth lower portion 40, just beyond the reach of the protrusions 38. As the guide housing 36 moves to the check position, the smooth lower portion 40 rides within the recess 42 of plug 34 (FIG. 5). Lower portion 40 of guide housing 36 has an inner and outer diameter. The dampening disk 10 rides inside guide housing 36 against the inner diameter of lower portions 40. The diameter of dampening disk 10 can be varied to achieve a desired clearance between the dampening disk 10 and the inner diameter of the lower portion 40 of guide housing 36. In addition, the inner diameter of the recess 42 (FIG. 5) can be varied to achieve a desired clearance between recess 42 and the outer diameter of the lower portion 40 of guide housing 36.

FIG. 3 shows a side valve of variable displacement pump 32. Pump 32 includes two decoupled check-relief valves 44 and 46 (not shown) in the end cap 30 of pump 32. In the preferred embodiment, cavity 26 is machined into pump end cap 30 (FIG. 5). The decoupled check-relief valve, as shown in FIG. 2, is received within cavity 26 of pump end cap 30. Plug 34 is attached to the exterior of pump end cap 30 to support and retain the decoupled check-relief valve 44. Typically, plug 34 is attached to the pump end cap 30 with threads. Alternatively, plug 34 can be integrated into pump end cap 30 or any other portion of variable displacement pump 32. The present invention can be adapted for use in other locations on a hydrostatic pump. Further, the present invention can be adapted for use with other components on a hydraulic fluid circuit as well as other applications.

Figure 4:
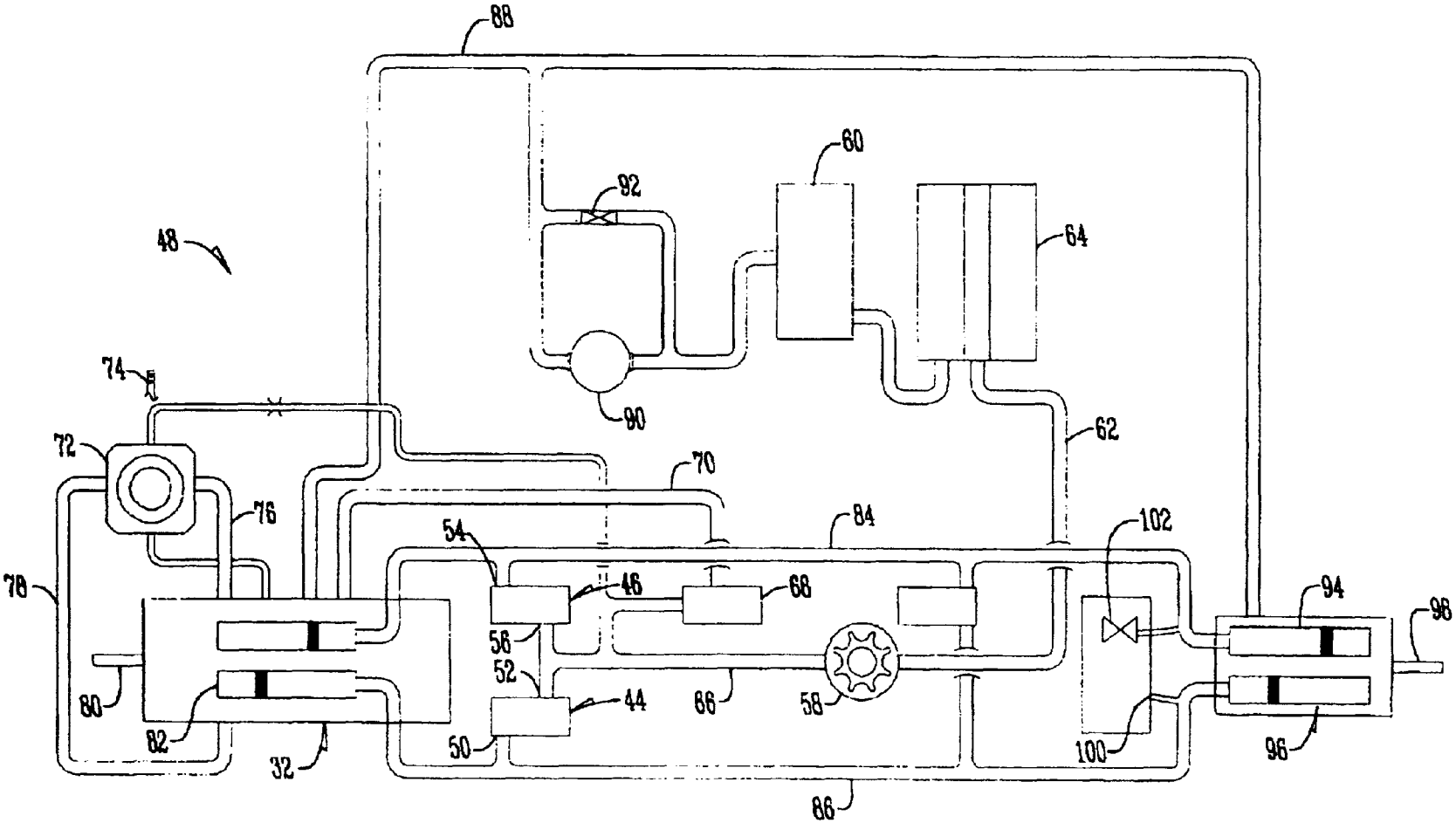
FIG. 4 is a process and instrument schematic of a hydraulic fluid circuit for the present invention.

FIG. 4 shows a process and instrument schematic of a hydraulic fluid circuit 48 that has been adapted to use two decoupled check-relief valves 44 and 46 of the present invention. One decoupled check-relief valve 44 has a system pressure port 50 and a charge pressure port 52. The other decoupled check-relief valve 46 has a system pressure port 43 and a charge pressure port 56.

In describing the process of the hydraulic fluid circuit 48 as shown in FIG. 4, charge pump 58 draws suction flow from a reservoir 60 through line 62, which passes through a filter 64. The charge pressure leaves charge pump 58 through line 66. Charge relief valve 68 ensures that the charge pressure leaving charge pump 58 does not exceed a certain threshold level. Charge relief valve 68 vents excess pressure through line 70. Charge pressure flows through displacement control valve 72. Control handle 74 regulates displacement control valve 72, throttling charge pressure through line 76 or case flow through line 78 to variable displacement pump 32. Input shaft 80 drives cylinder block assembly 82 of variable displacement pump 32. The variable displacement pump 32 draws charge pressure from line 84 and creates high pressure, which leaves the cylinder block assembly 82 through line 86. Case flow also leaves variable displacement pump 32 through line 88, which passes the case flow through a heat exchanger 90 or a heat exchanger bypass 92 and back to the receiver 60. High pressure leaving variable displacement pump 32 then flows into cylinder block assembly 94 of fixed displacement motor 96. High pressure in cylinder block assembly 94 drives outputs shaft 98. The cylinder block assembly 94 then returns charge pressure through charge line 84 back to variable displacement pump 32 and the rest of the flow circuit. Loop flushing module 100 includes charge pressure relief valve 102, which prevents charge pressure from exceeding a certain threshold level.

When high pressure flowing into port 50 on decoupled check-relief valve 44 exceeds a certain threshold level, valve 44 moves to the relief position to allow high pressure to pass from port 50 to port 52. Should charge pressure at port 52 exceed the pressure at port 50, valve 44 moves to the check position to allow the charge flow to pass from port 52 to port 50.

Decoupled check-relief valve 46 operates in a similar manner. When system pressure flowing into port 54 on decoupled check-relief valve 46 exceeds a certain threshold level, valve 46 moves to the relief position to allow the system pressure to pass from port 54 to port 56. Should charge pressure at port 56 exceed the pressure at port 54, valve 46 moves to the check position to allow the charge pressure to pass from portion 56 to port 54.

Figure 6A:
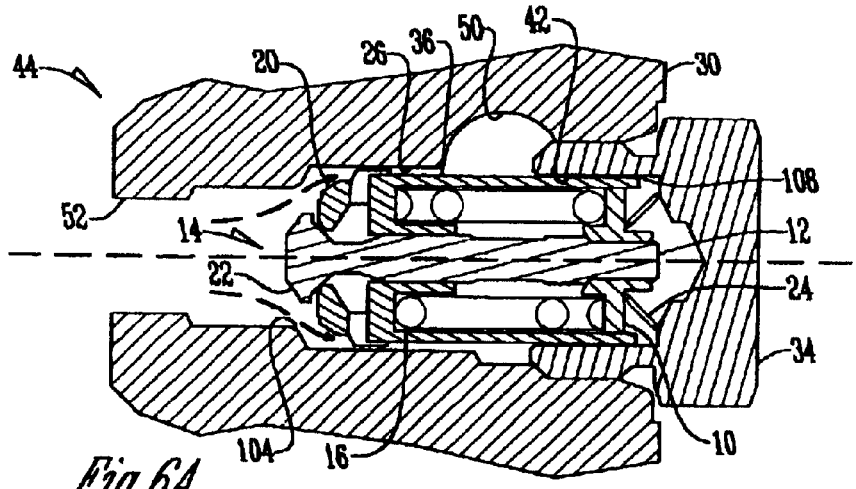
FIG. 6A is a sectional view similar to FIG. 6.
Figure 6:
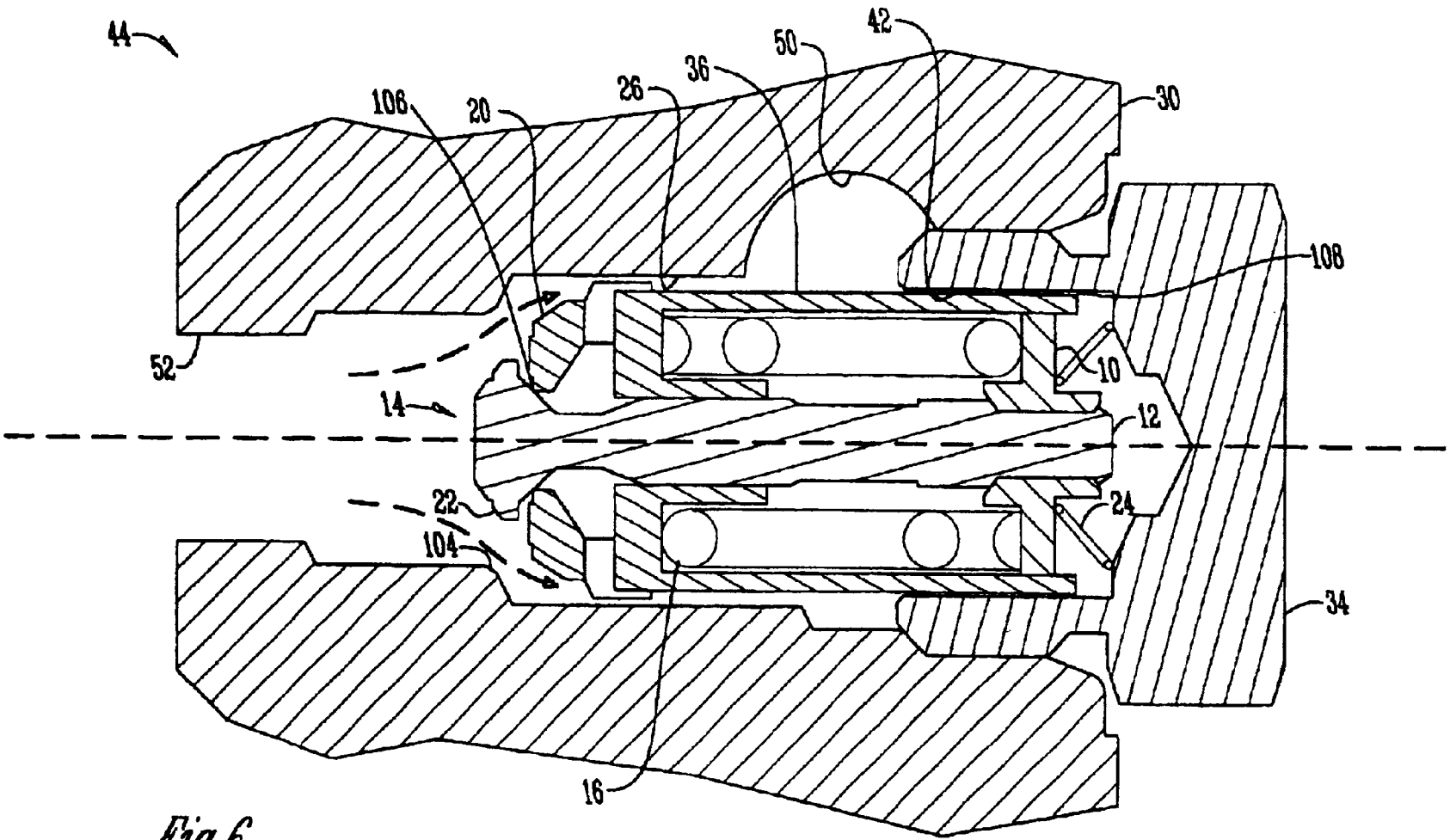
FIG. 6 is a sectional view of the decoupled check-relief valve of FIG. 4 in the check position.
Figure 7:
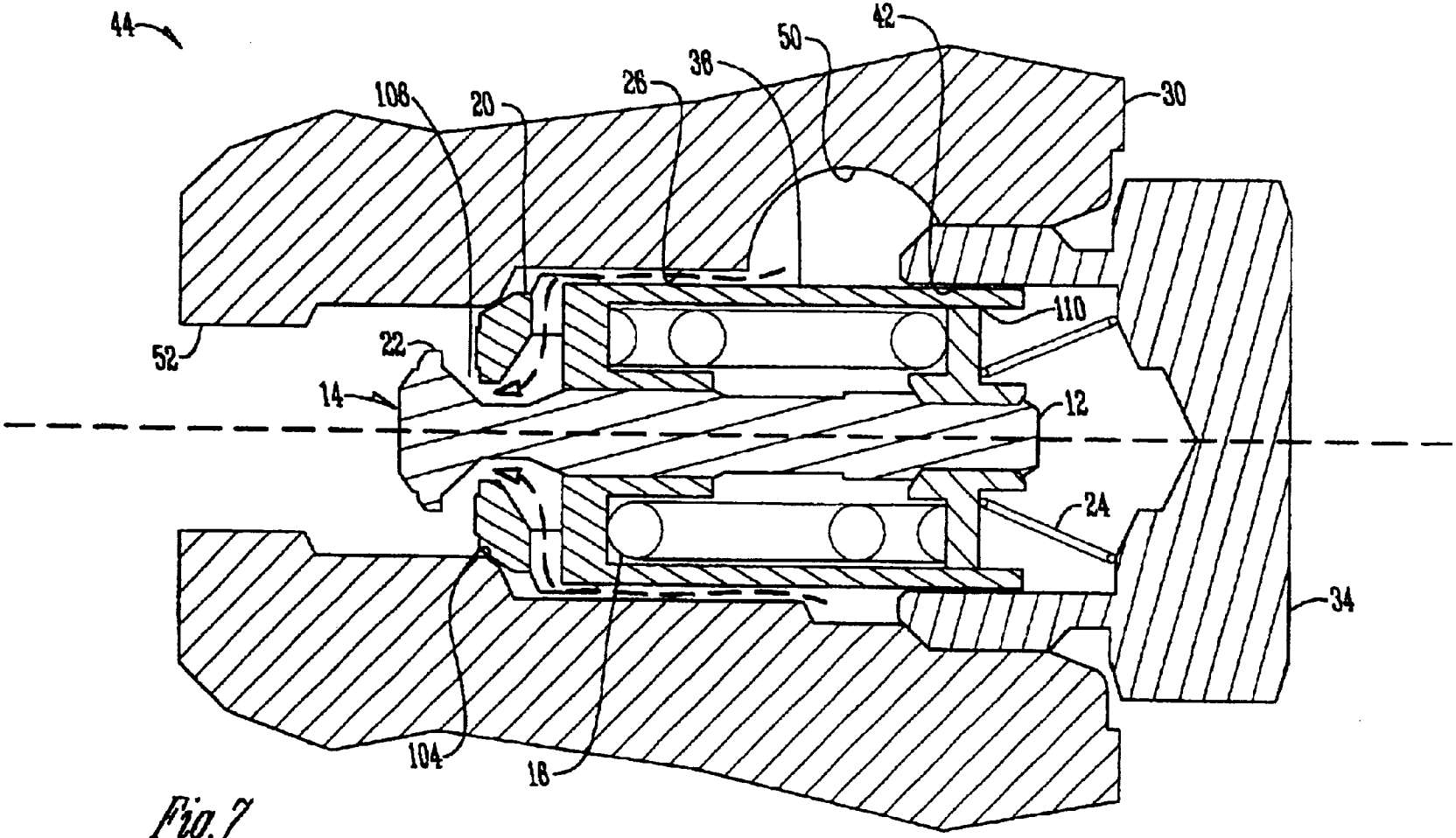
FIG. 7 is a sectional view of the decoupled check-relief valve of FIG. 4 in the relief position.

FIGS. 5–7 show the operation of the present invention and FIGS. 5A–7A have been arranged on one sheet to more clearly illustrate the operation. FIG. 5 shows the valve 44 in the closed or neutral position, where the seat 20 of the decoupled check-relief valve 44 is pressed against sealing surface 104 of cavity 26 within end cap 30. In this position, the pressure at port 50 (hereinafter referred to as "P2") is greater than the pressure at port 52 (hereinafter referred to as "P1"). If P1 exceeds P2, then the valve will move into the check position depicted in FIG. 6. While in the closed position, P2 also must be less than the relief pressure setting, which is a parameter controlled by the relief spring 16 and set according to the desired application. If P2 exceeds the relief pressure setting, then the valve will move into the relief position shown in FIG. 7. While in the closed position, the combined force of P2 pushing on guide housing 36 and the spring force of check spring 24 push the seat 20 firmly against seating surface 104. This creates a seal against the seating surface 104 that prevents fluid from getting past the seat. In addition, the force of P1 pushing on the head 22 of stem 14 pushes the head 22 firmly against the seat 20. This creates a seal against port 106 in seat 20, preventing fluid from seeping through port 106.

If P1 exceeds P2, then the pressure of P1 against the stem 14 and the seat 20 will drive the valve into the check position, as shown in FIG. 6. At this point, the force created by P1 on the surface of stem 14 and seat 20 overcomes the resisting force created by P2 and the spring force created by check spring 24. Check spring 24 compresses against the bottom wall of recess 42 of plug 24 as the combination of stem 14, seat 20, cylindrical guide housing 36 and dampening disk 10, in unison, push on spring 24. The valve assembly then shifts to the right, creating a gap between seat 20 and seating surface 104, creating a check fluid path between seat 20 and seating surface 104. As the valve assembly moves to the check position, the relief spring 16 is not compressed. The relief spring 16 and the dampening disk 10 shift along with the rest of the valve assembly 44 and the dampening disk 10 maintains its position with respect to the guide housing 36.

A check clearance 108 exists between the outer diameter of cylindrical guide housing 36 and the inner diameter of recess 42 in plug 34. This check clearance 108 regulates the check function of the valve. It is desirable for the check clearance 108 to be large to ensure a rapid check response, particularly during cold start operations. This greater check clearance will allow the guide housing 36 to quickly plunge into recess 42 of plug 34. The specific check clearance depends upon the application and desired needs of check-relief valve 44.

The check function also can be regulated by varying the parameters of the check spring 24. The characteristics, including the number of coils, the spring diameter, and the wire diameter, can be altered to vary the spring constant and performance of spring 24, depending upon the application and desired needs of check-relief valve 44.

If P2 exceeds the relief pressure setting, then the force created by P2 on the dampening disk 10 will drive the valve into the relief position, as shown in FIG. 7. Specifically, the force created by P2 on the bottom surface of dampening disk 10 will cause the combination of the dampening disk 10 and stem 14, in unison, to push upon and compress relief spring 16. The cylindrical guide housing 36 and seat 20 cannot move with the dampening disk 10 and stem 14 as they are retained by the seating surface 104. Therefore, relief spring 16 is forced to compress inside cylindrical guide housing 36 as dampening disk 10 shifts to the relief position. As the relief spring 16 compresses inside guide housing 36, the dampening disk 10 and stem 14 shifts to the left to create a gap between port 106 and head 22 of stem 14. This creates a relief fluid path through port 106.

The relief pressure setting is a parameter governed primarily by the characteristics of relief spring 16. The relief pressure setting can be altered depending upon the application and desired needs of check-relief valve 44.

A relief clearance 110 exists between the outer diameter of dampening disk 10 and the inner diameter of cylindrical guide housing 36. This relief clearance 110 regulates stability of the relief function of the valve. It is desirable for relief clearance 110 to be small to provide dampening and stability, particularly at hotter operating temperatures. This smaller relief clearance increases dampening, which prevents the valve from suddenly and drastically shifting to the vent position. This makes for a more stable fluid circuit. Further, the dampening also prevents the head 22 of stem 14 from slamming back into port 106 of seat 20. Dampening also prevents high frequency oscillation of stem 14, thereby eliminating valve squeal. The specific relief clearance depends upon the application and desired needs of check-relief valve 44.

The relief function also can be regulated by varying the parameters of the relief spring 16. The characteristics, including the number of coils, the spring diameter, and the wire diameter, can be altered to vary the spring constant and performance of spring 16, depending upon the application and desired needs of check-relief valve 44.

Because the addition of cylindrical guide housing 36, and check clearance parameter associated with the check function is separate from the relief clearance parameter associated with the relief function. In addition, these two clearance parameters can be selected independently to optimize both of the check and relief functions, depending upon the application and desired needs. Specifically, check clearance 108 (FIG. 6) can be selected to vary the speed of the check function. Similarly, relief clearance 110 (FIG. 7) can be selected to vary the dampening speed of the relief function.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A hydraulic fluid circuit comprising:

a [hydrostatic pump] *component* having [an elongated end cap] *a* housing [with a plug in an end of the cap housing];

a first line in communication with the [hydrostatic pump] *component* for carrying fluid of a first pressure;

a second line in communication with the [hydrostatic pump] *component* for carrying fluid of a second pressure;

a check relief valve movable within the [end cap] housing and positioned between the first line and the second line, the valve having a dampening element moveably received within a guide housing; [and]

a check spring positioned between the dampening element and the [plug.] *housing; and*

*wherein the check relief valve further comprises a seat connected to a first end of the guide housing, a stem that is slideably received through the seat and connected to the dampening element, and a relief spring positioned between the seat and the dampening element.*

2. The device of claim 1 further comprising a first clearance between an outer diameter of the guide housing and an inner recess of [the] *a* plug for movement of the valve within the plug.

3. The device of claim 2 further comprising a second clearance between an inner diameter of the guide housing and an outer diameter of the dampening element for movement of the dampening element within the guide housing.

[4. The device of claim 1 wherein the check relief valve further comprises a seat connected to a first end of the guide housing, a stem that is slideably received through the seat and connected to the dampening element, and a relief spring positioned between the seat and the dampening element.]

5. The device of claim 1 wherein the check valve is alternatively moveable from a closed position to a check position and a relief position.

6. The device of claim 5 wherein the check relief valve moves to the check position when the first pressure in the first line is greater than the second pressure in the second line.

7. The device of claim 3 wherein the check relief valve moves to the relief position when the second pressure in the second line is greater than the first pressure in the first line.

*8. A hydraulic fluid circuit comprising:*

*a component having a housing;*

*a first line in communication with the component for carrying fluid of a first pressure;*

*a second line in communication with the component for carrying fluid of a second pressure;*

*a check relief valve movable within the housing and positioned between the first line and the second line, the valve having a dampening element moveably received within a guide housing;*

*a check spring positioned between the dampening element and the housing;*

*the guide housing slidably mounted within the end cap housing for longitudinal movement therein;*

*a seat connected to the guide housing;*

*a stem having first and second ends extending through the seat at the first end and connected to a dampening element at the second end; and*

*the dampening element being slidably received within the guide housing.*

*9. The device of claim 8 further comprising a first clearance between an outer diameter of the guide housing and an inner recess of the plug for movement of the valve within the plug.*

*10. The device of claim 8 further comprising a second clearance between an inner diameter of the guide housing and an outer diameter of the dampening element for movement of the dampening element within the guide housing.*

*11. The device of claim 8 wherein the dampening element and the stem together move independently of the seat and the guide housing together.*

*12. The device of claim 8 further comprising a first clearance between an outer diameter of the guide housing and an inner recess of the plug and a second clearance between an outer diameter of the dampening element and an inner diameter of the guide housing.*

*13. The device of claim 1 wherein the component is a hydrostatic pump having an elongated end cap housing that forms a section of the housing of the component, with a plug in an end of the end cap housing.*

* * * * *